Dec. 11, 1962             G. BORDINI             3,067,728
METHOD AND APPARATUS FOR MOTION CONVERSION AND TRANSMISSION
Filed Oct. 13, 1959                           5 Sheets-Sheet 3
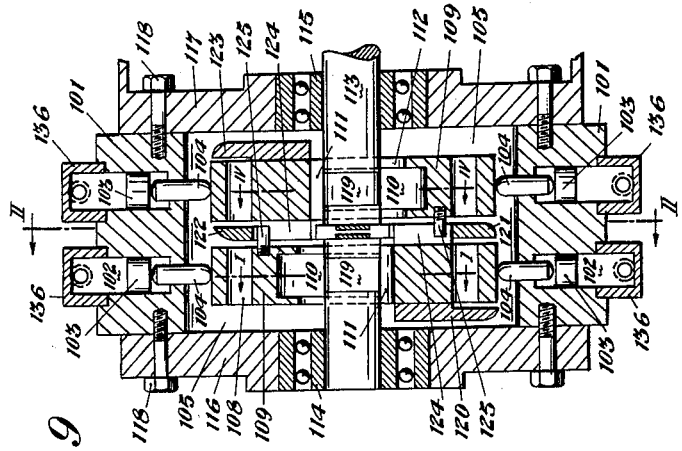
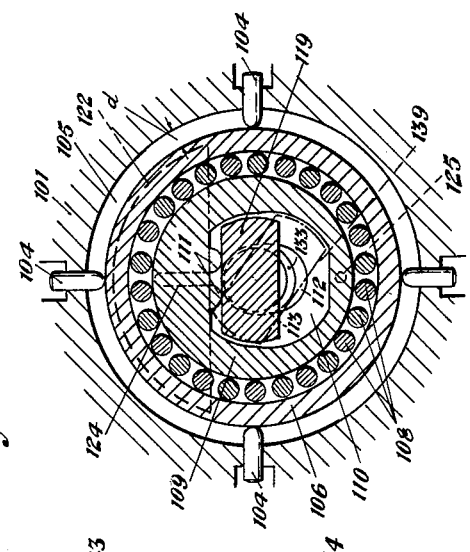

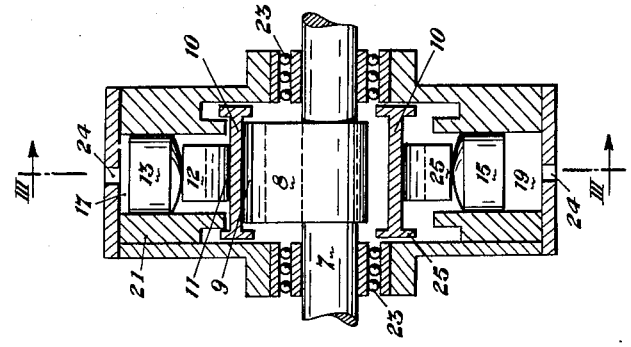

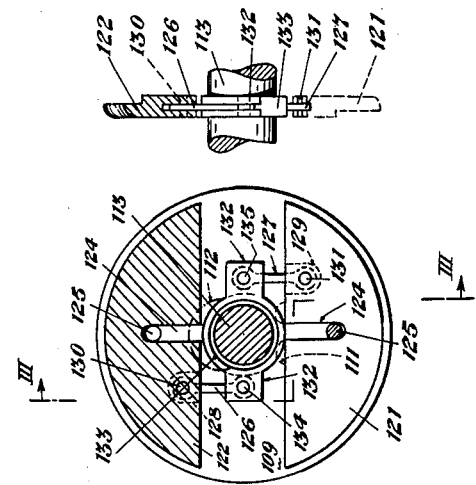
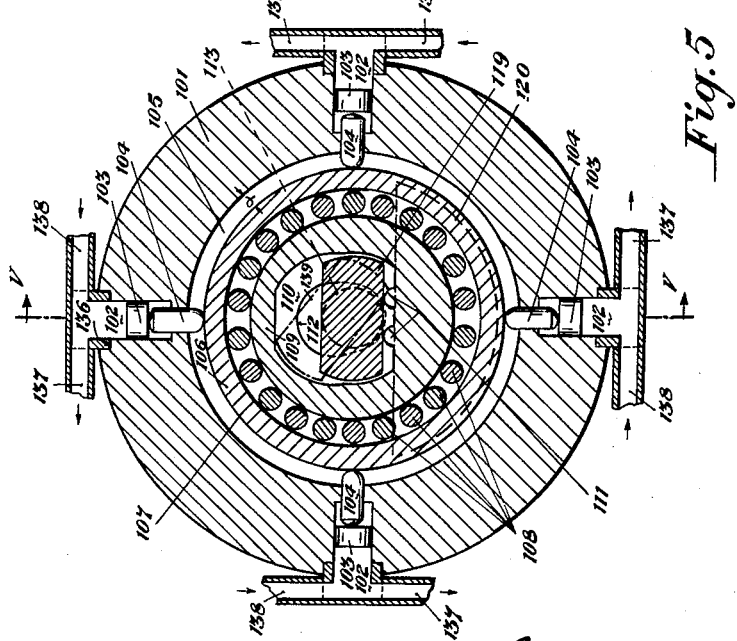

Dec. 11, 1962 G. BORDINI 3,067,728
METHOD AND APPARATUS FOR MOTION CONVERSION AND TRANSMISSION
Filed Oct. 13, 1959 5 Sheets-Sheet 4
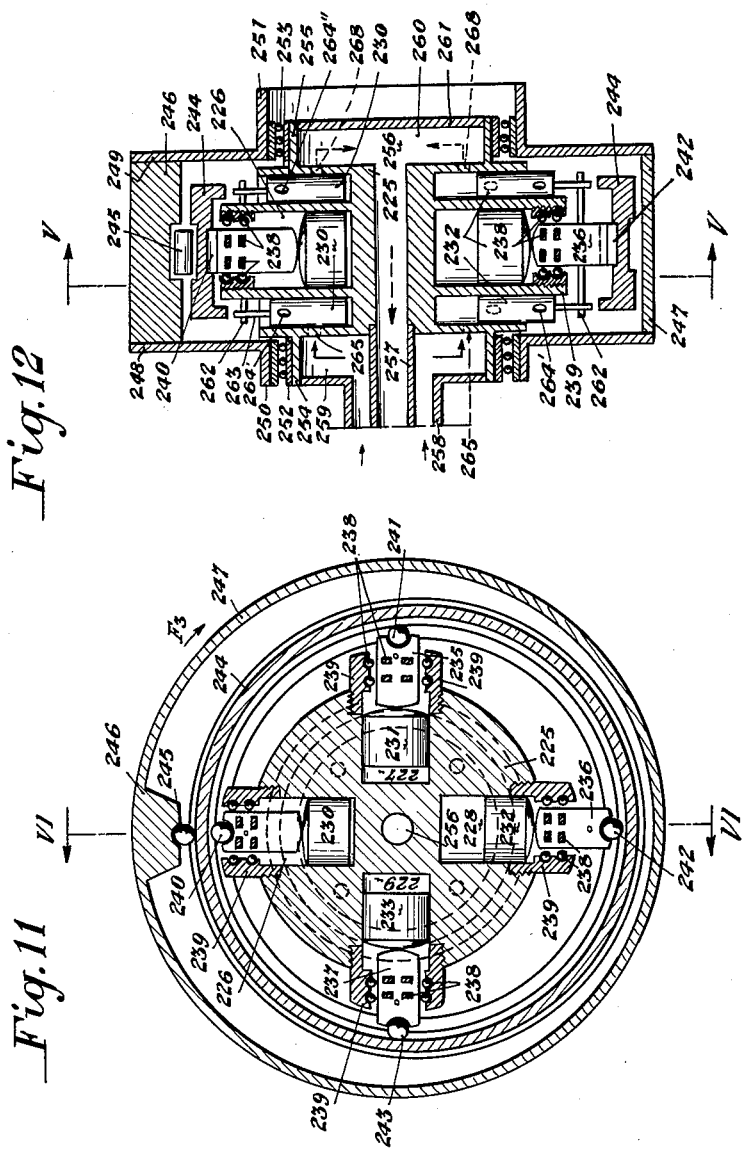
INVENTOR.
Giovanni Bordini
BY
Beaman & Beaman
atty s Dec. 11, 1962  G. BORDINI  3,067,728
METHOD AND APPARATUS FOR MOTION CONVERSION AND TRANSMISSION
Filed Oct. 13, 1959  5 Sheets-Sheet 5

INVENTOR
Giovanni Bordini
BY
Beaman & Beaman
attys

United States Patent Office 3,067,728
Patented Dec. 11, 1962

3,067,728
METHOD AND APPARATUS FOR MOTION
CONVERSION AND TRANSMISSION
Giovanni Bordini, Via Squarcialupo 21, Rome, Italy
Filed Oct. 13, 1959, Ser. No. 846,101
Claims priority, application Italy Oct. 31, 1958
8 Claims. (Cl. 121—120)

The present invention relates to mechanical motion-converting methods and apparatus, and more particularly to the conversion of motions by the positive displacement of a fluid.

One object of the present invention is to provide a new and improved method for the conversion of a reciprocating into a rotary motion or conversely from a rotary into a reciprocating motion.

Another object of the present inventon is to provide a device operating according to the aforesaid method, where the elimination of most of the machine members conventionally required for the mechanical conversion of a reciprocating into a rotary motion, or vice versa, is accomplished and the invention opens new fields of application for the hydraulic transmission and conversion of motions.

A further object of the present invention is to provide, by coupling one or more devices to a fluid pump by a suitable piping system, a positive-displacement-type hydraulic transmission of a rotary or a reciprocating motion to any desired distance, especially in its application to the power transmission systems of land, air or water craft.

The present invention is based on the finding, that a ring which is freely movable in a cylindrical bore of a diameter larger than the outside diameter of the ring, and which is held eccentrically against the bore wall by some freely rotatable means connected to a shaft journaled coaxially with the bore, can be caused to roll along said bore wall by reciprocating forces exerted against it in a cyclic succession and thereby to impart a rotary motion to said shaft through said freely rotatable means. As it will be illustrated in the following description, such means establishing a link between ring and shaft can be levers, cranks, or even rolling bearings such as ball, roller or pin bearings. If the forces cyclically acting upon the ring are imparted by pistons working in cylinders suitably arranged around the circumference of the bore and projecting into it, the transformation of the reciprocating motion of the pistons into a rotary motion of the shaft can be inverted by making the shaft the driving member, whose rotation will cause the ring to roll along the bore wall and push the pistons into their respective cylinders.

Thus, the above described method represents a new way of converting a reciprocating motion into a rotary motion and vice versa, whereby the machine members conventionally used for such conversion and connecting the reciprocating with the revolving parts, such as connecting rods, crossheads, crankshafts and the heavy flywheels are eliminated.

On the other hand, if the cylinders are conveniently connected, through suitably arranged pressure pipes, with a rotary or a reciprocating pump feeding hydraulic fluid in a cyclic succession into them, the pump motion or, in a wider sense, the motion of the engine or motor driving the pump, can be transmitted and eventually conveyed any distance, whereby the hydraulic fluid, if a liquid—owing to its incompressibility—acts as a positive connecting member between the pump pistons and the pistons of the device built according to the present invention.

As will be seen later, the invention can be applied successfully to all kinds of land, water or air craft, where a compact construction of the drive mechanisms and a saving of weight, combined with a safe operation is of paramount importantance. Because of their extremely compact construction, the devices made according to the present method might be applied wherever space is at a premium, thus, for instance, in vessels directly on the propeller shaft, whereby the shaft line is eliminated, in helicopters having two rotors directly on the rotor shaft, and in motor vehicles directly on each wheel axle, so that all four or more wheels are turned into driving wheels, and in this latter application the propeller shaft, clutch, transmission and differential gears become superfluous.

It is obvious that if in the present invention a rotary motion is converted into a reciprocating motion after the manner described, the fluid in the cylinders is pumped into the liquid line by the pistons cyclically actuated by the ring: thus, the method leads to a pumping action.

The method and the device of the present invention will now be described with reference to the accompanying drawings, wherein:

FIGS. 1 and 2 are schematic views illustrating the principle underlying the present invention;

FIG. 3 is a sectional view on the line III—III of FIG. 4, of an embodiment of the device according to the present invention;

FIG. 4 is an axial section of the embodiment shown in FIG. 3 on line IV—IV of FIG. 3;

FIG. 5 is a sectional plan, on line I—I of FIG. 9, of another embodiment of the device of the present invention;

FIG. 6 is a sectional view on line II—II of FIG. 9, of the revolving member of the embodiment shown in FIG. 5;

FIG. 7 is a longitudinal section on line III—III of the components shown in FIG. 6;

FIG. 8 is a partial section on line IV—IV through the embodiment shown in FIG. 5;

FIG. 9 is a longitudinal section on line V—V of the embodiment shown in FIG. 5;

FIG. 10 is a piping diagram for the connection of two devices according to the present invention, with one device operating as a pump and the other as a motor;

FIG. 11 is a schematic sectional view through a third embodiment of the device, taken on line V—V of FIG. 12;

FIG. 12 is a schematic axial section of the device shown in FIG. 11 on line VI—VI of FIG. 11;

Figure 13:
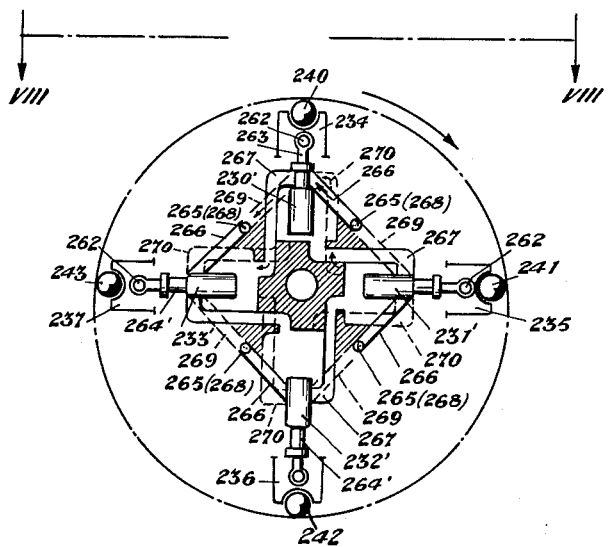
FIG. 13 is a schematic plan of the distributing system for the hydraulic fluid within the device shown in FIGS. 11 and 12 seen in an axial direction, on line VII—VII of FIG. 14.

FIGS. 1 and 2 show the principle of motion conversion according to the present invention. Along the internal surface of a cylindrical bore 1 passing through a body 2 is a ring 3 of an outside diameter smaller than the bore diameter. Coaxially with the bore axis a shaft or spindle 6 is journaled having a radial level 5 formed with an end which engages the ring and holds the ring 3, through the intermediary of a freely rotating roll 4, against the wall of bore 1. In the position shown in FIG. 1, the ring 3 touches the bore at A, so that the centre of the former (ring 3) remains eccentrically displaced with respect to the centre of the latter (bore 1).

If, in the position shown in FIG. 1, a pressure is exerted in the direction of arrow $P_1$ upon the ring 3, the latter rolls along the bore wall in the direction of arrow $F_1$, and its line of contact with the bore wall describes a quarter circle to the point $A_2$—opposite to the point of application of force P'. Thereby, ring 3 presses the lever 5 through the intermediary of roll 4 in the same direction and causes it to revolve, together with its shaft 6, in the same direction. Shortly before the line of contact between ring and bore has reached position $A_2$, a second pressure is imparted upon the ring, say according to arrow $P_2$ passing vertically through the previous line of contact. There occurs a repetition of the former phase: ring 3 rolls on in the direction of arrow $F_2$, until its line of contact with the bore has reached a position diametrically opposite to the original point $A_1$, and imparts thereby an additional 90° rotation to the shaft 6, in the described manner. A new pressure imparted to the ring at point $A_2$ will cause it to roll further, until its line of contact with the bore has reached the position of the first pressure $P_1$, and so forth.

It is clear that when a cyclic succession of radially acting forces is imparted to the ring 3, shaft 6 will be entrained by the rolling of ring 3 into a revolving motion. To obtain said motion it is not essential (though advantageous) that the pressure exerting members act radially, nor that they be arranged crosswise, at an angle of 90° with respect to each other. Furthermore, the rotation of the shaft by the ring is not limited to the use of a lever or shaft as an intermediary: both the lever 5 and the single roll 4 can be replaced, e.g. by an arrangement according to FIG. 8 or by any kind of sliding or rolling bearings, so that ring 3 acts on the outer face of the roller, ball or pin bearings, and the strain on the single roll of FIGS. 1 and 2 becomes now evenly distributed on all the rolls, balls or pins of the bearing, while the inner face of the latter is fastened or meshes with the shaft 6.

The device shown in FIGS. 3 and 4 represents an embodiment of the present invention. A shaft 7 is passed through a cylindrical cavity 22 of a cylinder block 21, journaled coaxially with said cavity 22 and rotating on ball bearings 23. A lever or throw 8 is shrunk or otherwise fastened on shaft 7, whose end holds a loose roller 9, through which it lifts an otherwise freely movable flanged ring 10 against the cavity wall. The outside diameter of ring 10 is smaller than the diameter of cavity 22. Four cylinders 17, 18, 19 and 20 are provided in the cylinder block 21, opening radially into the bore 22 along two diameters perpendicular to each other. In each cylinder 17 to 20, work pistons 13, 14, 15 and 16 respectively as well as intermediate pistons 12, are guided by means not represented in the figures and elements 12 carry loosely retained rollers 11. Each cylinder 17–20 communicates, through openings 24 with a suitable distributor of any known type, and therefore not represented in the drawings, which feeds, in cyclic succession, hydraulic fluid into one cylinder and permits its outflow from the remaining cylinders. In this arrangement, the hydraulic fluid is circulated in a closed system comprising a pump, piping system, distributor system and cylinders, and no mechanical means exist to effect a positive connection between the pistons defining the fluid system and the revolving parts of the device.

It is clear that the transmission ratio between pump and motor can be constructionally fixed by suitably proportioning the ratio of the respective cylinder diameters, piston strokes (the latter being dependent upon the difference between the outside diameter of the ring 10 and the diameter of the cavity 22) etc.

Within the limits determined by the construction data of pump and motor the speed of the latter can be varied continuously by changing the speed of the engine driving the pump.

A further possibility of changing the transmission ratio will be described later.

It is clear that by reversing the circulation of the hydraulic fluid the sense of rotation of the motor will also be reversed. As shown in FIG. 4, ring 10 is provided with two lateral flanges guided in corresponding grooves of cavity 22.

In the embodiment shown in FIGS. 5 to 9, the roller 9 is replaced by a set of rollers 108 and lever 8 by a disk 109. Shaft 113 is not fastened to disk 109, but passes through an elongated opening 112 of the disk, which permits a relative displacement of the disk 109 and thus of ring 106 in a radial direction. This elongated opening 112 opens into recess 110, whose two cams 111, in any relative position between revolving disk 109 and shaft 113 will remain in contact with the latter's cross arm 119 (see the position 139 of said arm, as indicated by the dotted line) and thus cause it to revolve around its axis.

This type of connection results in a certain independence between shaft 113 and the disk 109 cooperating with cross arm 119 to act as a lever, such an arrangement being particularly advantageous when the engine driving the pump is started.

As shown in FIG. 9, in this embodiment two devices according to the present invention are combined into a single unit, where fluid pressure in two cylinders 102 provided in the cylinder block 101 work the pistons 103 which act in turn upon the intermediate pistons 104. Also in this embodiment, the shaft 113 is journaled, coaxially with respect to the cavity 105, in the ball bearings 114 and 115 mounted in the flanges of the plates 116 and 117 fastened to the cylinder block 101.

Within each recess 110, the shaft 113 supports a cross arm 119. In the central position of the disks 109 both cross arms rest with one of their flat sides upon two cams 111 provided in each recess. Each disk has fastened to it two segment-shaped weights 120, 121 and 122, 123 respectively, whereby the segments 120, 121 of the left disk (FIG. 9) are mounted diametrically opposite the segments 122, 123 of the right disk 109.

Each of the two segments 121 and 122, mounted on the disk sides facing each other has a guide slot 124 (FIG. 6) for a pin 125 fastened to the opposite disk side. In addition, both segments 121 and 122 are articulated to each other by links 126 and 127 which connect the pin 130 of segment 122 and the pin 131 of segment 121 with the pins 134 and 135, respectively, of the forked arms 132 of a ring rotatably mounted on shaft 113.

Each cylinder 102 carries a T-joint 136 connecting it with the feed line 138 and the discharge line 137 of the hydraulic fluid system. The operation of the device as a drive mechanism converting a rotary into a reciprocating motion is exactly similar to, but reverse from, that of the device described with reference to FIGS. 1 to 4. The reverse conversion, i.e. the transformation of a rotary into a series of reciprocating motions, and particularly the operation of this embodiment as a pumping device will now be described.

If the shaft 113 is rotated by a prime mover around its axis, it will transmit its rotary motion, over its cross arms 119 and cams 111, to both disks 109. The latter, being eccentrically weighted with segments 120, 121 and 122, 123, respectively, are driven in opposite directions by the centrifugal forces which are acting upon them. The eccentric rotation of each disk will cause its corresponding ring 106 to cyclically oscillate, with a 180° phase displacement to each other, in the cavity 105, and they will consequently push the intermediate pistons 104 and the pistons 103 of each corresponding set in cyclic succession into their respective cylinders 102, thus pressing the hydraulic fluid or gas existing in said cylinders through the T-couplings 135 into the pipes of the system.

If the pump has to work against a certain back pressure in the piping, and if the speed of the prime mover driving the shaft is initially small, the centrifugal force imparted to the disk is insufficient to push the pistons 103, over ring 106 and intermediate piston 104, against the fluid pressure in their respective cylinders 102.

Consequently the disks revolve coaxially with the shaft, the device does not pump, and therefore its shaft does not exert any resistance upon the prime mover rotating it. This permits the latter to increase its speed. The consequent increase in speed of shaft 113 leads to an increase in the centrifugal forces acting upon both disks 109. Their eccentricity increases proportionately to the centrifugal forces imparted to them and proportionately to the liquid pressure still existing in the cylinders. This eccentricity determines the stroke of the pistons within their respective cylinders. If the back pressure in the cylinders is high, the piston stroke will remain short even if the shaft has attained a high number of revolutions. In this case the fluid in the system will be pumped by the device at a small flow rate and a high pressure—the former being caused by the shortness of the piston strokes and the latter by the great centrifugal forces arising from the high speed attained by the prime mover, coupled to shaft 113.

On the other hand, a decrease in the back pressure in the fluid system and thus in the cylinders 102 will bring about, even at a constant speed of shaft 113, a corresponding increase in the eccentricity of the disks 109. Thus, the stroke of the pistons 103 will become longer and consequently the pump will deliver at a higher flow rate.

The maximum eccentricity attainable by the disks is also in this embodiment determined by the difference $d$ between the diameter of cavity 105 and the outside diameter of ring 106. The disks 109, when driven apart by the centrifugal forces, are guided by the cooperation of the elongated opening 112 and the arrangement described with reference to FIGS. 6 and 7, so as to shift diametrically away from each other and to the same mutual distance from the shaft axis.

The advantages of the invention will become clear in the following example of an application thereof to a motor vehicle, such as a heavy truck. The application will be discussed with reference to the piping diagram shown in FIG. 10, in which reference number 140 symbolises a device or a plurality of parallel connected devices according to the present invention, such as the embodiment shown in FIGS. 3 and 4, while the cylinders 102, the pistons 103 (not shown) and intermediate pistons 104 symbolize the corresponding organs of the embodiment illustrated in FIGS. 5 to 9. If we assume the latter to operate as a pump driven by a truck engine, while the device 140 is assumed to be directly coupled to the rear axle of the truck, or even, in a preferred alternative, as a number of such devices, directly coupled to two, four (or more) wheels of the vehicle, the pipes 137 will operate as delivery pipes conveying in pairs the hydraulic fluid from the pump cylinders 102, through inlet valves 141 of known construction, into a header 142, whence the fluid will flow under pressure through a conduit 143 and a distributor, not shown, of known type, which feeds it in cyclic succession into the cylinders of the devices 140 operating as wheel drivers. Thence it flows through a return conduit 144 into the header 145, and from there, through outlet valves 146 and conduits 138, into the pump cylinders diametrically located opposite to those being just actuated by the rings 106. When a motor vehicle having a drive assembly of the known art is started, especially under heavy load and in an uphill direction, the engine is allowed to gather speed almost until it has reached its full torque before coupling it with the lowest gear or with the reducer of the transmission.

As the starting resistance of the vehicle decreases, the next higher gears will be engaged in succession, either manually or automatically.

In a truck having drive assembly according to FIG. 10, the starting operations will follow the following pattern: the starting resistance of the vehicle will be transmitted to the shafts of the single driver units fluid motors 140 coupled to the rear axle or axles or directly to the wheels. Thus, the pump pistons 103, in FIG. 10, are shown in a displacement position and connection with the pistons of the devices 140, will meet with a considerable back pressure of the hydraulic fluid filling the cylinders 102, and thus will counteract the centrifugal forces driving apart the disks 109. According to the previous description, therefore, the pump will not deliver and thus it will not exert any resistance upon the engine, as the back pressure in the piping system, which is proportional to the starting resistance of the vehicle, is greater or equal to the centrifugal force of the disks 109. Therefore, the engine is free to gather speed, and therefore both the shaft 113 and the disks 109 revolve with increasing velocity. But since the starting resistance and consequently the back pressure is still high; for the reasons explained above, the eccentricity of the disks and thus the stroke is still small, and the pump delivers at a low speed but at a high pressure, until the starting resistance of the vehicle is gradually overcome. With decreasing starting resistance, the backpressure of the fluid in the cylinders diminishes, the disk eccentricity becomes larger, and thus the stroke of pistons 103 becomes greater and accordingly the flow velocity of the liquid in the system increases. This leads to an increasing of the number of revolutions of the wheel drivers 140, and therefore to an increase in the speed of the vehicle. One the resistance to motion of the vehicle has reached its normal operating level, its speed can be directly adjusted by varying the engine speed.

Owing to their compactness and simplicity of construction, drivers of the kind described in FIGS. 3 and 4 can be easily applied directly to one or more pairs of wheels of a motor vehicle, so as to obtain a four or more wheel drive.

Under favourable transport conditions, the flow to one or more pairs of drivers 140 can be restricted, so that an increased quantity of hydraulic fluid will be delivered by the pump to the remaining drivers, which leads to a proportional increase of the vehicle's velocity.

On the other hand, if the circulation of the liquid is throttled, for instance by a suitable valve, the discharge pressure in the cylinders of the drivers 140 will be increased, and this will result in a braking action being exerted by the drivers upon the wheels. This action can be increased to a complete blocking of the vehicle if the throttling is carried as far as to completely close the circuit. From the above description it becomes clear that the application of the present invention to motor vehicles eliminates such heavy and costly parts as clutch, transmission, propeller shaft and universal joints, and even the differential. Change from forward into reverse motion or vice versa can be effected by reversing, by any of the known means, the flow direction in the pipe circuit.

In the embodiment shown in FIGS. 11 to 14 the arrangement cylinder block, ring and shaft have been reversed with respect to that shown in FIGS. 3 and 4, while the basic principles remain the same. In this embodiment there is also illustrated a distributing system for the hydraulic fluid, governed by the pistons of the device. The illustrated cylinder block 225 contains four cylinders 226, 227, and 229, disposed along the two diameters perpendicular to each other and opening towards the outer surface of the cylindrically shaped cylinder-block. In the cylinders reciprocate the pistons 230, 231, 232 and 233 and their relating intermediate pistons 234, 235, 236 and 237, the latter having a rectangular cross section and being guided, within the extension pieces 239, by rollers 238 rotating within semicircular grooves of said extension pieces. Each intermediate piston carries at its outer end an additional roller, 240, 241, 242 and 243, respectively, contacting the inner surface of a freely movable ring 244, while the external surface of the latter bears against another roller 245 rotatably housed in a cam 246 of an external ring 247. Cam 246 projects into a cylindrical chamber formed by an external ring 247 and the two circular plates 248 and 249 fastened to its two sides.

Each plate 248 and 249 has a central boss, acting as hollow shafts 250 and 251, respectively, containing the ball bearings 252 and 253, respectively, mounted on the corresponding bosses 254 and 255 of the cylinder block 225. Thus the cylinder block 225 and the outer ring 247 are coaxially rotatable with respect to each other. By this arrangement, the freely movable ring 244 will be constantly kept in an eccentric position by the cam 246 and its roll 245. On the other hand, the outer ring 247 and the cylinder block 225 cannot be radially displaced relatively to each other, and the distance between roller 245 and the axis of the cylinder block cannot be changed.

The operation of this embodiment is as follows: if hydraulic fluid is delivered under pressure into cylinder 229, piston 233 will push the intermediate piston 237 and roller 243 against ring 244 and thus the latter will be pressed against the outer ring 247. Owing to the fixed distance of 247 from the centre axis of the system, roller 245 and consequently cam 246 and outer ring 247 must rotate in the direction of arrow $F_3$, to the point corresponding to cylinder 227. By feeding pressure into cylinder 226, the outer ring 247 will perform a further 90° rotation in the same direction. As a result of a cyclic succession of filling and discharging of the four cylinders, a continuous rotation of the outer ring and of the hollow shafts 250 and 251 is obtained.

For the purpose of an automatic control of the filling and discharging of the hydraulic fluid in the cylinders, the cylinder block 225 has a central bore 256, ending in a circular chamber 260. Coaxially, around this first conduit runs a second, annular conduit ending in an annular chamber 259, formed by the walls of cylinder block 225, of boss 254 and the tube 257.

Figure 14:
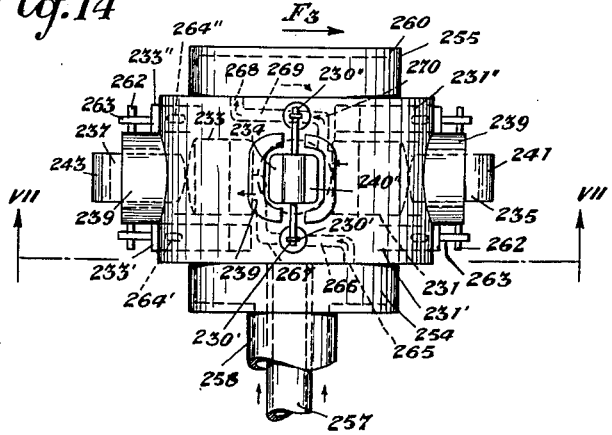
FIG. 14 is a top view, on line VIII—VIII of FIG. 13, of the stationary internal part of the embodiment shown in FIGS. 11 and 12, and a partial view of the hydraulic fluid circulation.

Each intermediate piston 234–237 carries two projecting pins 262, which are guided by slots cut into the extension pieces 239 (see FIG. 14). Each pin 262 engages in the eye of a piston rod 263, whose related piston reciprocates in a small bore provided in the cylinder block.

Such bores are provided on both sides of each cylinder 226 to 229 and the servo-pistons reciprocating in them carry the reference numbers 230', 230'', 231', 231'', 232', 232'', 233', 233'', where the reference number carrying one prime indicate the pistons located on the side of chamber 259, and the reference numbers with a double prime indicate those lying on the side of chamber 260.

Each servo-piston is transversally pierced by a hole 264' or 264'' respectively. From four openings 265 placed at right angles in chamber 259, four passages lead to the holes 264' of the corresponding servo-pistons 230', 231', 232', and 233', when the latter are in their lowermost position. In this position, the other end of the hole 264' opens into a second passage 267 which leads into the bottom of the immediately preceding cylinder, in a clockwise direction, as viewed in FIGS. 11 and 13. As shown in FIGS. 11, 13 and 14, when the servo-piston 230' has reached its lowermost position and hydraulic fluid is fed through the conduit 271 into chamber 259, it flows through the openings 265 and the passages 266 into the hole 264' of servo-piston 230', and thence, through passage 267, below the cylinder 233 immediately preceding it in the sense of rotation. When piston 230 moves the corresponding servo-piston 230' upwards, hole 264' is also lifted so that the solid lower part of the servo-piston gradually interrupts the communication between the passages 266 and 267 (see for instance piston 232' in FIG. 13).

Further openings 268 placed similarly to openings 265 lead from chamber 260 through passages 269 to the bores 264'', of the servo-pistons 230'', 231'', 232'' and 233'', when the latter take up their lowermost position, and from those bores into passages 270 ending in the bottom of the cylinder immediately following (in a clockwise direction).

The operation of this arrangement can be seen from FIGS. 11, 12 and 13. Cylinder 226 is empty, thus piston 230 and servo-pistons 230' and 230'' are in their lowermost position, thus opening the communication between chamber 259 and cylinder 229 (over opening 265, passage 266, hole 264' of servo-piston 230'', passage 269 into chamber 260) whence it is discharged into the return line of the circuit through the central bore 256. In FIGS. 13 and 14 the paths of the inflowing and outflowing liquid are indicated with full and dotted arrows respectively.

It is clear that each piston, for instance piston 230, governs the inflow of the fluid into the cylinder preceding it in the direction of rotation of the device and the outflow from the cylinder immediately following it, in the same direction of rotation. By reversing the flow direction also the direction of rotation is reversed.

Of course, in the described embodiments, the cylinder block can be made rotatable and the parts connected to the shaft made stationary. Nor is it essential that the cylinders and pistons be coplanarly disposed at right angles, for they can be arranged in various planes and placed in any numbers and at various mutual angles, whereby the operating cycle of the sets of cylinders on each plane can be displaced by any convenient angle. It is also unnecessary that the pistons act in a radial direction with respect to the axis of rotation of the system, or that the bore or cavity housing the ring be of a circular cross section.

It is also clear that the distribution system herein described is but an example and not essential for the operation of the present invention, as it has been repeatedly stated in the present specification that any suitable flow distributor of any known type will serve the purpose. Neither are the intermediate piston forms essential, and can be eliminated without prejudice to the efficiency of the invention. On the other hand, the pistons can be articulated to the revolving ring.

Without prejudice to the essence and object of the invention, and thus for the efficient working of the embodiments described, the intermediate pistons can be eliminated and the ring can be articulated, for instance by connecting members, to the pistons.

Although this invention has been described in some preferred forms with a certain degree of particularity enabling others to reproduce the invention, it is understood that the present disclosure has been made by way of example and that numerous modifications and changes in the details may be resorted to without departing from the spirit and scope of the invention as defined in the following claims.

What is claimed is:

1. Motion conversion apparatus employing a fluid medium comprising, in combination, a body member having a cylindrical cavity defined therein, a shaft rotatably journaled in said body coaxially extending into said cavity, a radially extending lever affixed to said shaft having a roller means mounted upon the outer end thereof, a free floating annular cylindrical ring within said cavity of a lesser outer diameter than the cavity diameter, said roller engaging the inner diameter of said ring maintaining one portion of the outer diameter thereof in engagement with the wall cavity, a plurality of radially disposed cylinders defined within said body circumferentially spaced about and communicating with said cavity, a piston within each cylinder operatively engaging the outer surface of said ring, a fluid medium within said cylinders in communication with a pressure source and means cyclically pressurizing said cylinders whereby said pistons exert a radial circumferentially progressing force on said ring to roll said ring about said cavity and rotate said shaft.

2. In an apparatus as in claim 1 wherein said cylinders are four in number and are angularly spaced at 90° from each other in said body member.

3. Motion conversion apparatus employing a fluid medium comprising, in combination, a body member having a cylindrical cavity defined therein, a shaft rotatably journaled in said body coaxially extending into said cavity, a free floating radially movable disc having a cylindrical periphery and a central elongated opening mounted on said shaft, a plurality of rollers mounted on the disc periphery, a recess within said disc communicating with said elongated opening having cam portions defined therein, a radially extending arm fixed to said shaft and located within said recess establishing a driving connection with said disc through said cams at all relative positions of said disc and shaft, an annular cylindrical ring within said cavity mounted on said rollers, said ring having an outer diameter less than the cavity diameter, a plurality of radially disposed cylinders defined in said body circumferentially spaced about and in communication with said cavity, a piston within each cylinder operatively engaging the outer surface of said ring, a fluid medium within said cylinders in communication with a pressure source and means cyclically pressurizing said cylinders whereby said pistons exert a radial circumferentially progressing force on said ring to roll said ring within said cavity and rotate said shaft.

4. In an apparatus as in claim 3 wherein two such discs are drivingly associated with said shaft as described, said discs being relatively displaced 180°, a plurality of radially disposed cylinders and pistons circumferentially spaced about each of said discs, and means linking said discs equalizing the radial displacement thereof relative to the said shaft.

5. In an apparatus as in claim 4 wherein weights are eccentrically mounted on said discs with respect to the axis of said shafts, the weights of one of said discs being displaced 180° with respect to the weights of the other disc.

6. Motion conversion apparatus employing a fluid medium comprising, in combination, an inner body member having a plurality of radially disposed cylinders defined therein intersecting and spaced about the exterior surface thereof, a piston associated with each of said cylinders having a roller located at the outer end, a free floating annular ring circumscribing said body member engaged on the inner diameter by said rollers and supported thereby and freely radially displaceable relative to the axis of said body member, a second annular ring of larger inner diameter than the outer diameter of said free floating ring circumscribing said free floating ring, said second ring being coaxially rotatably supported on said body member and having a roller mounted on the inner surface thereof in engagement with the outer surface of said free floating ring maintaining said free floating ring eccentric to the axis of said body member, and a fluid medium within said cylinders wherein upon cyclically pressurizing said cylinders about said body member said pistons exert a radial circumferentially progressing force on and displacement of said free floating ring causing said free floating ring to orbit within said second ring and thereby rotate said second ring or upon rotation of said second ring said free floating ring progressively activates said pistons.

7. Apparatus for the conversion of motion employing a fluid medium comprising, in combination, a body member having a fixed longitudinal axis, a plurality of fluid cylinder members radially defined on said body member circumferentially about said axis, pistons operatively associated with said cylinder members, fluid circuit means in communication with said cylinder members, an annular cylindrical ring having an axis parallel to said body member axis, said ring being freely floatingly related to said body member and displaceable thereto in any radial direction relative to said body member axis and operatively associated with said pistons, a rotatably mounted element concentrically related to said body member having an axis of rotation coincident with said body member longitudinal axis, and means carried by said rotatably eccentric mounted element radially displacing and maintaining said ring relative to said body member axis.

8. A method for converting reciprocating motion into rotary motion, or rotary motion into reciprocating motion, wherein the reciprocating motion occurs within a plurality of pistons slideably received within cylinders radially related to and circumferentially spaced about the axis of rotary motion, and a radial arm is mounted on a rotatable element concentric to said axis, comprising the step of laterally displacing a rigid free-floating tubular cylindrical member relative to the axis of rotary motion by the sequential application of forces to said member in a radial direction progressively about said member, producing an eccentric member motion relative to and about said axis while said arm and pistons are in engagement with said member.

References Cited in the file of this patent

UNITED STATES PATENTS

| | | |
|---|---|---|
| 1,152,729 | Hele-Shaw | Sept. 7, 1915 |
| 1,445,474 | Benson et al. | Feb. 13, 1923 |
| 1,547,409 | Cacaud | July 28, 1925 |
| 1,828,677 | Oberdier | Oct. 20, 1931 |
| 2,006,237 | Eynard | June 25, 1935 |
| 2,472,355 | Whittingham | June 7, 1949 |
| 2,518,578 | Tomlinson | Aug. 15, 1950 |
| 2,585,574 | Muller | Feb. 12, 1952 |
| 2,646,755 | Joy | July 28, 1953 |
| 2,743,582 | Wiedmann | May 1, 1956 |
| 2,786,424 | Raymond | Mar. 26, 1957 |
| 2,945,451 | Griswold | July 19, 1960 |

FOREIGN PATENTS

| | | |
|---|---|---|
| 1,068,145 | France | June 22, 1954 |
| 268,272 | Switzerland | Aug. 16, 1950 |